United States Patent
McCarthy

(10) Patent No.: US 11,223,681 B2
(45) Date of Patent: Jan. 11, 2022

(54) UPDATING NO SYNC TECHNIQUE FOR ENSURING CONTINUOUS STORAGE SERVICE IN EVENT OF DEGRADED CLUSTER STATE

(71) Applicant: NetApp, Inc., Sunnyvale, CA (US)

(72) Inventor: Daniel David McCarthy, Erie, CO (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 16/845,786

(22) Filed: Apr. 10, 2020

(65) Prior Publication Data

US 2021/0320975 A1    Oct. 14, 2021

(51) Int. Cl.
*G06F 13/00* (2006.01)
*H04L 29/08* (2006.01)
(Continued)

(52) U.S. Cl.
CPC ...... *H04L 67/1097* (2013.01); *H04L 41/0893* (2013.01); *H04L 49/9078* (2013.01);
(Continued)

(58) Field of Classification Search
CPC . H04L 67/1097; H04L 67/2852; H04L 67/34; H04L 41/0893; H04L 49/9078; H04L 67/1095; H04L 67/1036
(Continued)

(56) References Cited

U.S. PATENT DOCUMENTS 7,159,150 B2   1/2007  Kenchammana-Hosekote et al.
7,483,318 B2   1/2009  Ogihara et al.
(Continued)

FOREIGN PATENT DOCUMENTS

| CN | 102307221 A | 1/2012 |
|---|---|---|
| CN | 104765661 B | 4/2018 |
| WO | WO2017113280 A1 | 7/2017 |

OTHER PUBLICATIONS

Amazon web services, Data Warehouse System Architecture, Amazon Redshift, 2020, 3 pages.
(Continued)

*Primary Examiner* — Kenneth R Coulter
(74) *Attorney, Agent, or Firm* — Jaffery Watson Mendonsa & Hamilton LLP

(57) ABSTRACT

An Updating No Sync (UNS) technique ensures continuous data protection for content driven distribution of data served by storage nodes of a fault tolerant cluster in the event of a degraded cluster state. A storage service implemented in each node includes one or more slice services (SSs) configured to process and store metadata describing the data served by the storage nodes and one or more block services (BSs) configured to process and store the data on storage devices of the node. A bin assignment service may coopt one or more healthy BSs to temporarily store updates of data and metadata received at the SS while the cluster is in the degraded state as an overflow data path (hence the term "Updating No Sync," which denotes updating without synchronizing, i.e., not distributing the data within the cluster, but only accumulating an overflow of SS information). Once the cluster is no longer degraded, the accumulated overflow SS information at the BSs may be synchronized back to restored BSs, i.e., according to write path determination in the absence of node failure/unavailability.

20 Claims, 6 Drawing Sheets

(51) Int. Cl.
*H04L 12/24* (2006.01)
*H04L 12/861* (2013.01)

(52) U.S. Cl.
CPC ...... *H04L 67/1036* (2013.01); *H04L 67/1095* (2013.01); *H04L 67/2852* (2013.01); *H04L 67/34* (2013.01)

(58) Field of Classification Search
USPC ......... 709/201, 222, 220, 248, 203, 208–211
See application file for complete search history.

(56) References Cited

U.S. PATENT DOCUMENTS

| | | | |
|---|---|---|---|
| 7,571,290 B1 | 8/2009 | Ranade et al. | |
| 8,255,739 B1 | 8/2012 | Chatterjee et al. | |
| 8,521,685 B1 | 8/2013 | Chatterjee et al. | |
| 9,146,840 B2 * | 9/2015 | Alderman | G06F 11/0793 |
| 9,852,033 B2 | 12/2017 | Southern et al. | |
| 10,025,678 B2 * | 7/2018 | Alderman | H04L 67/10 |
| 10,387,255 B2 | 8/2019 | Zeng | |
| 10,509,708 B2 * | 12/2019 | Xiang | G06F 11/2094 |
| 10,540,368 B2 * | 1/2020 | Chan | H04L 67/26 |
| 10,713,134 B2 * | 7/2020 | Wang | G06F 11/2048 |
| 2010/0138687 A1 | 6/2010 | Noguchi et al. | |
| 2014/0006844 A1 * | 1/2014 | Alderman | G06F 11/0793 |
| | | | 714/4.1 |
| 2014/0095734 A1 * | 4/2014 | Chan | G06F 16/27 |
| | | | 709/248 |
| 2015/0363281 A1 * | 12/2015 | Alderman | G06F 11/3668 |
| | | | 714/4.1 |
| 2017/0242767 A1 | 8/2017 | Wang et al. | |
| 2018/0357140 A1 | 12/2018 | Xiang et al. | |

OTHER PUBLICATIONS

IBM Spectrum Scale. Version 5.0.3, Command and Programming Reference, 2019, 1458 pages.

* cited by examiner

UPDATING NO SYNC TECHNIQUE FOR ENSURING CONTINUOUS STORAGE SERVICE IN EVENT OF DEGRADED CLUSTER STATE

BACKGROUND

Technical Field

The present disclosure relates to protection of data served by storage nodes of a cluster and, more specifically, to ensuring continuous data protection of content driven distributed data blocks served by the storage nodes in the event of degraded cluster state.

Background Information

A plurality of storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives, solid state drives, flash memory systems, or other storage devices. The storage nodes may logically organize the data stored on the devices as volumes accessible as logical units (LUNs). Each volume may be implemented as a set of data structures, such as data blocks that store data for the volume and metadata blocks that describe the data of the volume. For example, the metadata may describe, e.g., identify, storage locations on the devices for the data blocks.

To further improve data redundancy, methods such as duplication and erasure coding may be used in a fault tolerant cluster of storage nodes, wherein there are typically two or more copies of data stored on the nodes. Typically, in the event of failure of one or more nodes of the cluster, incoming data may be written to temporary storage on healthy nodes. However, such temporary storage usually has a limited capacity that may become exhausted which limits the ability of the cluster to satisfy write requests, thereby challenging availability of the cluster as a whole.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to an Updating No Sync (UNS) technique that is configured to ensure continuous data protection, such as replication and erasure coding, and storage service for content driven distribution of data served by storage nodes of a fault tolerant cluster in the event of a degraded cluster state, e.g., failure of one or more block services of nodes configured to process the data. A storage service implemented in each node includes a metadata layer having one or more slice services (SSs) configured to process and store metadata describing the data served by the storage nodes and a block server layer having one or more block services (BSs) configured to process and store the data on storage devices of the node. According to the technique, one or more healthy BSs may be coopted (i.e., delegated) by a bin assignment service to temporarily store updates of data received at the SS while the cluster is in the degraded state as an overflow data path (hence the term "Updating No Sync," which denotes updating without synchronizing, i.e., not distributing the data within the cluster, but only accumulating an overflow of SS information). Once the cluster is no longer degraded, the accumulated overflow SS information at the BSs may be synchronized back to restored BSs, i.e., synchronized according to write path determination in the absence of node failure/unavailability.

DESCRIPTION

Storage Cluster

Figure 1:
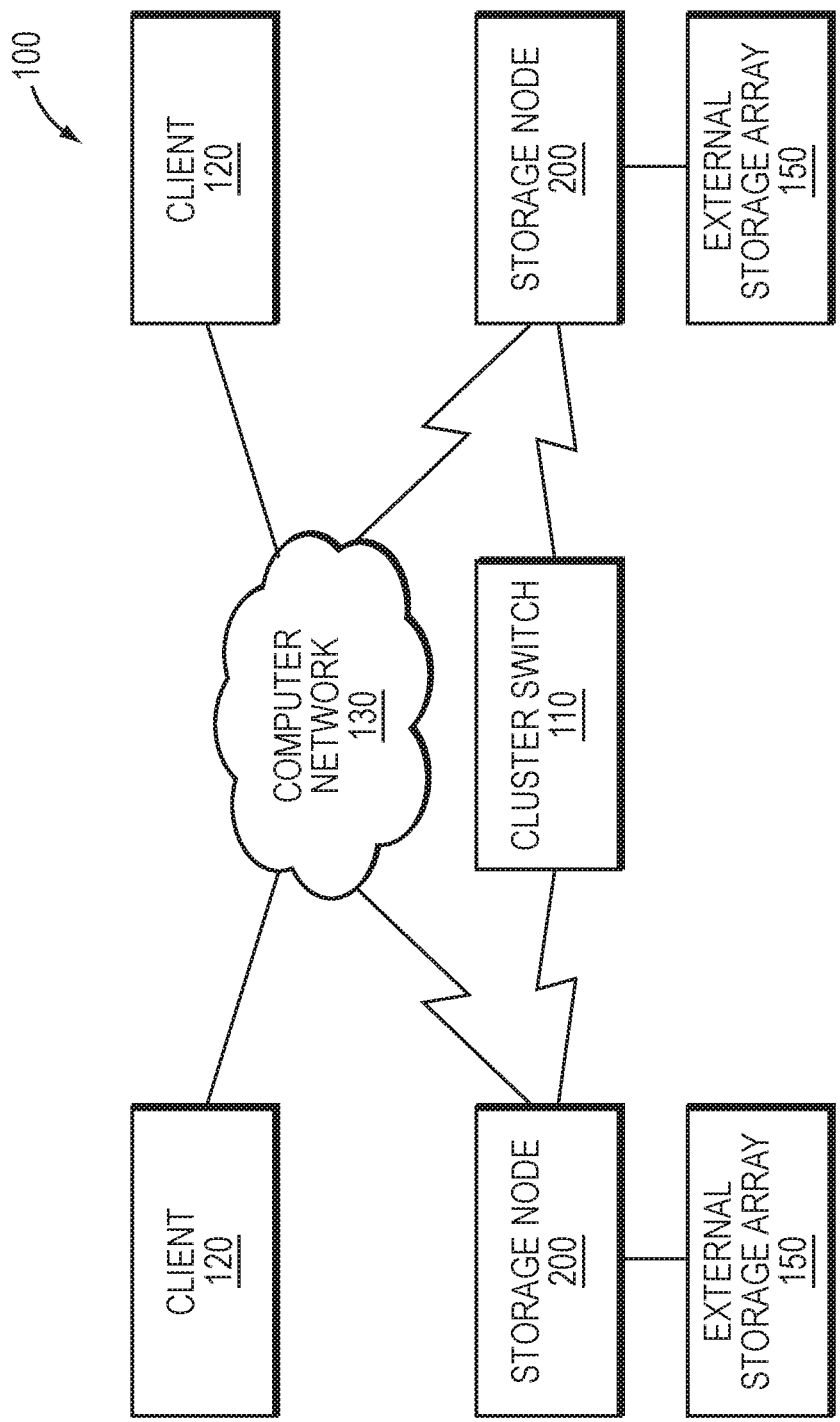
FIG. 1 is a block diagram of a plurality of storage nodes interconnected as a storage cluster.

FIG. 1 is a block diagram of a plurality of storage nodes 200 interconnected as a storage cluster 100 and configured to provide storage service for information, i.e., data and metadata, organized and stored on storage devices of the cluster. The storage nodes 200 may be interconnected by a cluster switch 110 and include functional components that cooperate to provide a distributed, scale-out storage architecture of the cluster 100. The components of each storage node 200 include hardware and software functionality that enable the node to connect to and service one or more clients 120 over a computer network 130, as well as to a storage array 150 of storage devices, to thereby render the storage service in accordance with the distributed storage architecture.

Each client 120 may be embodied as a general-purpose computer configured to interact with the storage node 200 in accordance with a client/server model of information delivery. That is, the client 120 may request the services of the node 200, and the node may return the results of the services requested by the client, by exchanging packets over the network 130. The client may issue packets including file-based access protocols, such as the Network File System (NFS) and Common Internet File System (CIFS) protocols over the Transmission Control Protocol/Internet Protocol (TCP/IP), when accessing information on the storage node in the form of storage objects, such as files and directories. However, in an embodiment, the client 120 illustratively issues packets including block-based access protocols, such as the Small Computer Systems Interface (SCSI) protocol encapsulated over TCP (iSCSI) and SCSI encapsulated over Fibre Channel (FCP), when accessing information in the form of storage objects such as logical units (LUNs).

Figure 2:
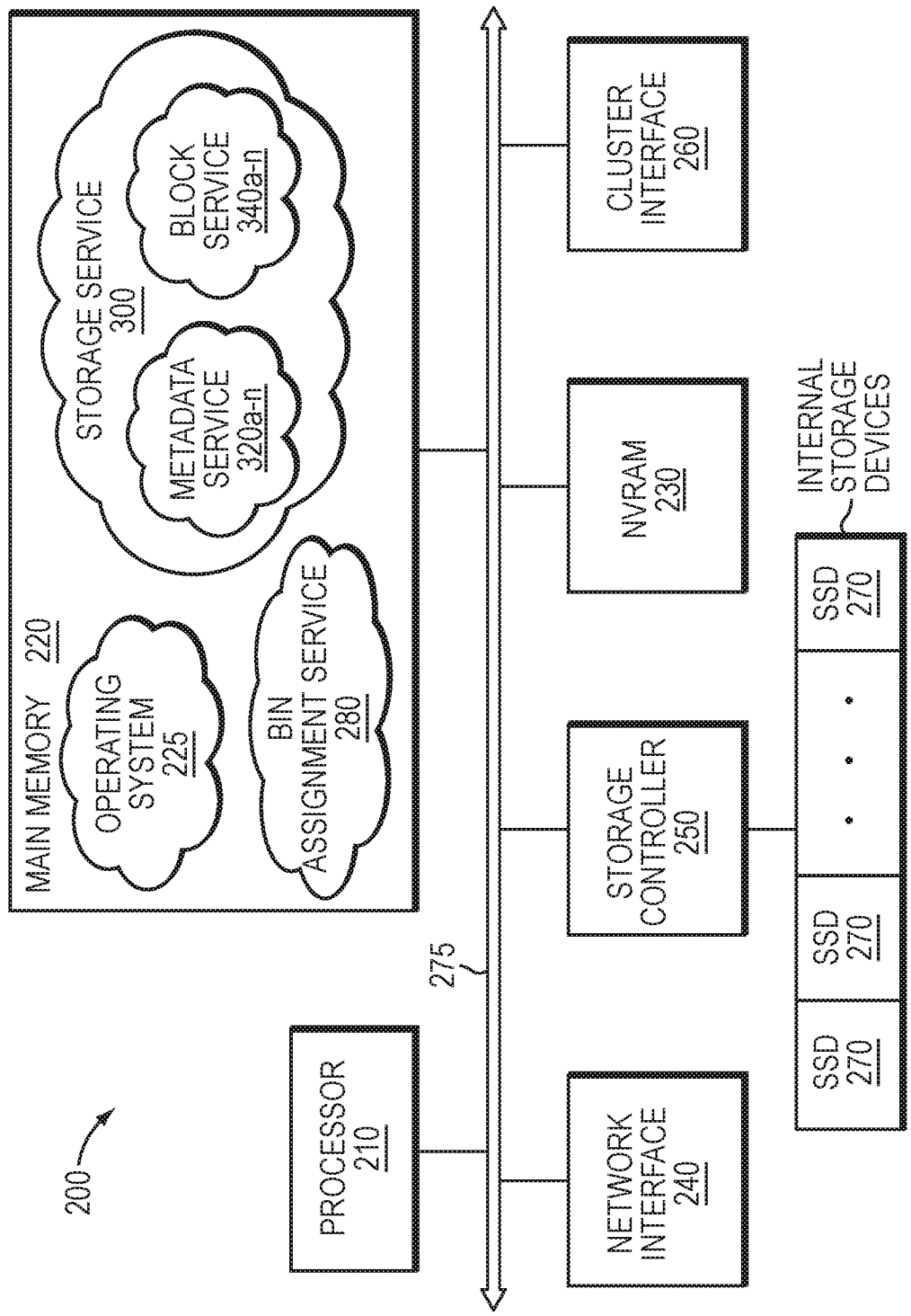
FIG. 2 is a block diagram of a storage node.

FIG. 2 is a block diagram of storage node 200 illustratively embodied as a computer system having one or more processing units (processors) 210, a main memory 220, a non-volatile random access memory (NVRAM) 230, a network interface 240, one or more storage controllers 250 and a cluster interface 260 interconnected by a system bus 275. The network interface 240 may include one or more ports adapted to couple the storage node 200 to the client(s) 120 over computer network 130, which may include point-to-point links, wide area networks, virtual private networks implemented over a public network (Internet) or a shared local area network. The network interface 240 thus includes the mechanical, electrical and signaling circuitry needed to connect the storage node to the network 130, which may embody an Ethernet or Fibre Channel (FC) network.

The main memory 220 may include memory locations that are addressable by the processor 210 for storing software programs and data structures associated with the embodiments described herein. The processor 210 may, in turn, include processing elements and/or logic circuitry configured to execute the software programs, such as one or more metadata services 320a-n and block services 340a-n of storage service 300 as well as a bin assignment service 280, and manipulate the data structures. An operating system 225, portions of which are typically resident in memory 220 (in-core) and executed by the processing elements (e.g., processor 210), functionally organizes the storage node by, inter alia, invoking operations in support of the storage service 300 implemented by the node. A suitable operating system 225 may include a general-purpose operating system, such as the UNIX® series or Microsoft Windows® series of operating systems, or an operating system with configurable functionality such as microkernels and embedded kernels. However, in an embodiment described herein, the operating system is illustratively the Linux® operating system. It will be apparent to those skilled in the art that other processing and memory means, including various computer readable media, may be used to store and execute program instructions pertaining to the embodiments herein. Also, while the embodiments herein are described in terms of software programs, services, code, processes, and computer, e.g., applications stored in memory, alternative embodiments also include the code, processes and programs being embodied as logic and/or modules consisting of hardware, software, firmware, or combinations thereof.

The storage controller 250 cooperates with the storage service 300 implemented on the storage node 200 to access information requested by the client 120. The information is preferably stored on storage devices such as internal solid-state drives (SSDs) 270, illustratively embodied as flash storage devices as well as SSDs of external storage array 150 (i.e., an additional storage array attached to the node). In an embodiment, the flash storage devices may be block-oriented devices (i.e., drives accessed as blocks) based on NAND flash components, e.g., single-level-cell (SLC) flash, multi-level-cell (MLC) flash or triple-level-cell (TLC) flash, although it will be understood to those skilled in the art that other block-oriented, non-volatile, solid-state electronic devices (e.g., drives based on storage class memory components) may be advantageously used with the embodiments described herein. The storage controller 250 may include one or more ports having I/O interface circuitry that couples to the SSDs 270 over an I/O interconnect arrangement, such as a serial attached SCSI (SAS) and serial ATA (SATA) topology.

The cluster interface 260 may include one or more ports adapted to couple the storage node 200 to the other node(s) of the cluster 100. In an embodiment, dual 10 Gbps Ethernet ports may be used for internode communication, although it will be apparent to those skilled in the art that other types of protocols and interconnects may be utilized within the embodiments described herein. The NVRAM 230 may include a back-up battery or other built-in last-state retention capability (e.g., non-volatile semiconductor memory such as storage class memory) that is capable of maintaining data in light of a failure to the storage node and cluster environment.

Storage Service

Figure 3A:
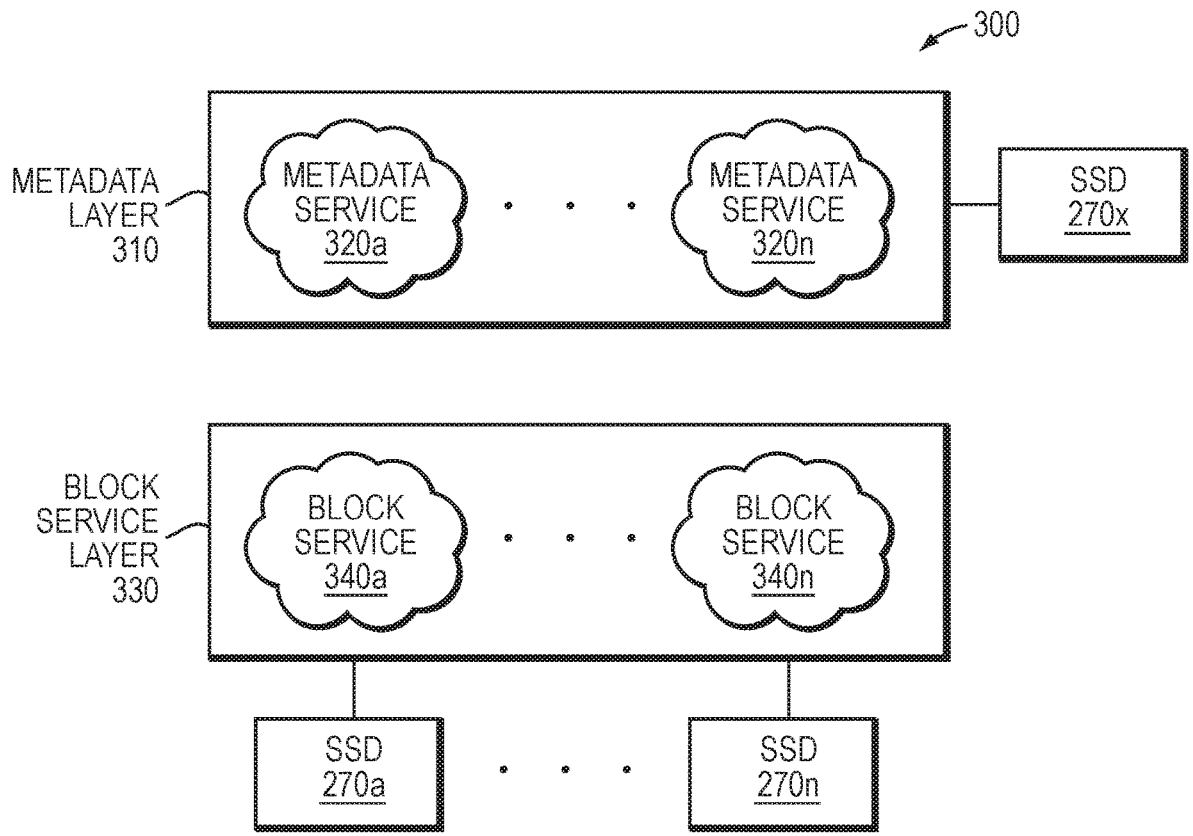
FIG. 3A is a block diagram of a storage service of the storage node.

FIG. 3A is a block diagram of the storage service 300 implemented by each storage node 200 of the storage cluster 100. The storage service 300 is illustratively organized as one or more software modules or layers that cooperate with other functional components of the nodes 200 to provide the distributed storage architecture of the cluster 100. In an embodiment, the distributed storage architecture aggregates and virtualizes the components (e.g., network, memory, and compute resources) to present an abstraction of a single storage system having a large pool of storage, i.e., all storage, including internal SSDs 270 and external storage arrays 150 of the nodes 200 for the entire cluster 100. In other words, the architecture consolidates storage throughout the cluster to enable storage of the LUNs, each of which may be apportioned into one or more logical volumes ("volumes") having a logical block size of either 4096 bytes (4 KB) or 512 bytes. Each volume may be further configured with properties such as size (storage capacity) and performance settings (quality of service), as well as access control, and may be thereafter accessible (i.e., exported) as a block storage pool to the clients, preferably via iSCSI and/or FCP. Both storage capacity and performance may then be subsequently "scaled out" by growing (adding) network, memory and compute resources of the nodes 200 to the cluster 100.

Each client 120 may issue packets as input/output (I/O) requests, i.e., storage requests, to access data of a volume served by a storage node 200, wherein a storage request may include data for storage on the volume (i.e., a write request) or data for retrieval from the volume (i.e., a read request), as well as client addressing in the form of a logical block address (LBA) or index into the volume based on the logical block size of the volume and a length. The client addressing may be embodied as metadata, which is separated from data within the distributed storage architecture, such that each node in the cluster may store the metadata and data on different storage devices (e.g., data on SSDs 270a-n and metadata on SSD 270x) of the storage array 150 coupled to the node. To that end, the storage service 300 implemented in each node 200 includes a metadata layer 310 having one or more metadata services 320a-n configured to process and store the metadata, e.g., on SSD 270x ("slice drive"), and a block server layer 330 having one or more block services 340a-n configured to process and store the data, e.g., on the SSDs 270a-n. For example, the metadata services 320a-n map between client addressing (e.g., LBA indexes) used by the clients to access the data on a volume and block addressing (e.g., block identifiers) used by the block services 340a-n to store and/or retrieve the data on the volume, e.g., of the SSDs.

Figure 3B:
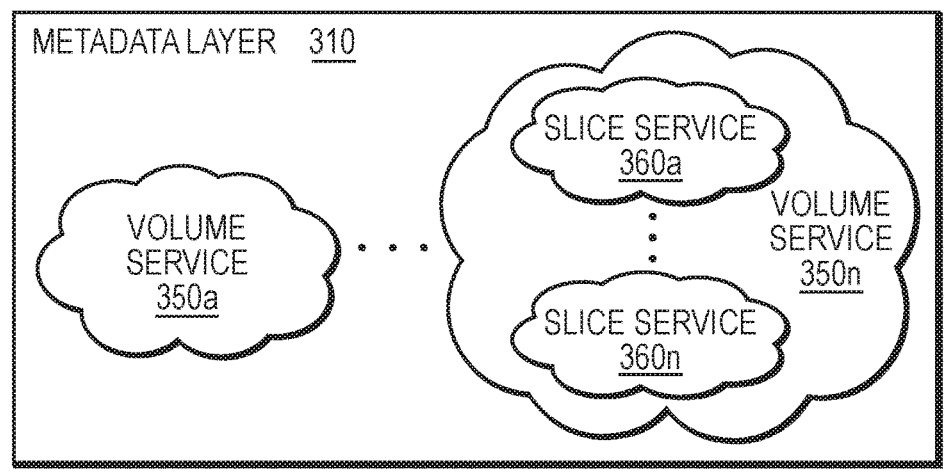
FIG. 3B is a block diagram of an exemplary embodiment of the storage service.

FIG. 3B is a block diagram of an alternative embodiment of the storage service 300. When issuing storage requests to the storage nodes, clients 120 typically connect to volumes (e.g., via indexes or LBAs) exported by the nodes. To provide an efficient implementation, the metadata layer 310 may be alternatively organized as one or more volume services 350a-n, wherein each volume service 350 may perform the functions of a metadata service 320 but at a granularity of a volume, i.e., process and store the metadata for the volume. However, the metadata for the volume may be too large for a single volume service 350 to process and store; accordingly, multiple slice services 360a-n may be associated with each volume service 350. The metadata for the volume may thus be divided into slices and a slice of metadata may be stored and processed on each slice service

360. In response to a storage request for a volume, a volume service 350 determines which slice service 360*a-n* contains the metadata for that volume and forwards the request the appropriate slice service 360.

Figure 4:
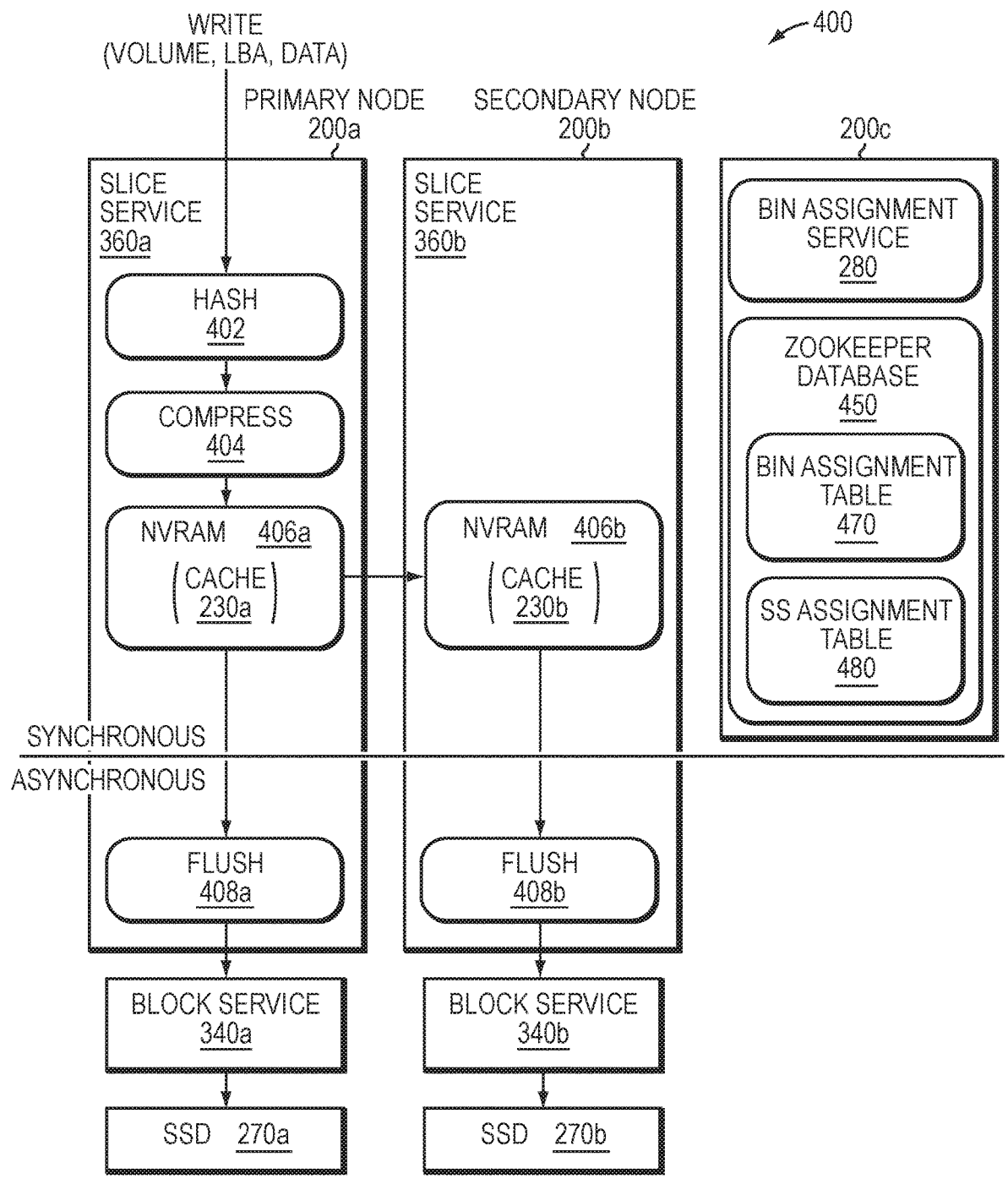
FIG. 4 illustrates a write path of the storage node.

FIG. 4 illustrates a write path 400 of a storage node 200 for storing data on a volume of a storage array 150. In an embodiment, an exemplary write request issued by a client 120 and received at a storage node 200 (e.g., primary node 200*a*) of the cluster 100 may have the following form:

write (volume, LBA, data)

wherein the volume specifies the logical volume to be written, the LBA is the logical block address to be written, and the data is the actual data to be written. Illustratively, the data received by a slice service 360*a* of the storage node 200*a* is divided into 4 KB block sizes. At box 402, each 4 KB data block is hashed using a cryptographic hash function to generate a 128-bit (16B) hash value (recorded as a block identifier (ID) of the data block); illustratively, the block ID is used to address (locate) the data on the internal SSDs 270 as well as the external storage array 150. A block ID is thus an identifier of a data block that is generated based on the content of the data block. The cryptographic hash function, e.g., Skein algorithm, provides a satisfactory random distribution of bits within the 16B hash value/block ID employed by the technique. At box 404, the data block is compressed using a compression algorithm, e.g., LZW (Lempel-Zif-Welch), and, at box 406*a*, the compressed data block is stored in NVRAM 230. Note that, in an embodiment, the NVRAM 230 is embodied as a write cache or, illustratively, a cache 230*a,b*. Each compressed data block is then synchronously replicated to the cache 230 of one or more additional storage nodes (e.g., secondary storage node 200*b*) in the cluster 100 for data protection (box 406*b*). An acknowledgement is returned to the client when the data block has been safely and persistently stored in the cache 230*a,b* of the multiple storage nodes 200*a,b* of the cluster 100.

Figure 5:
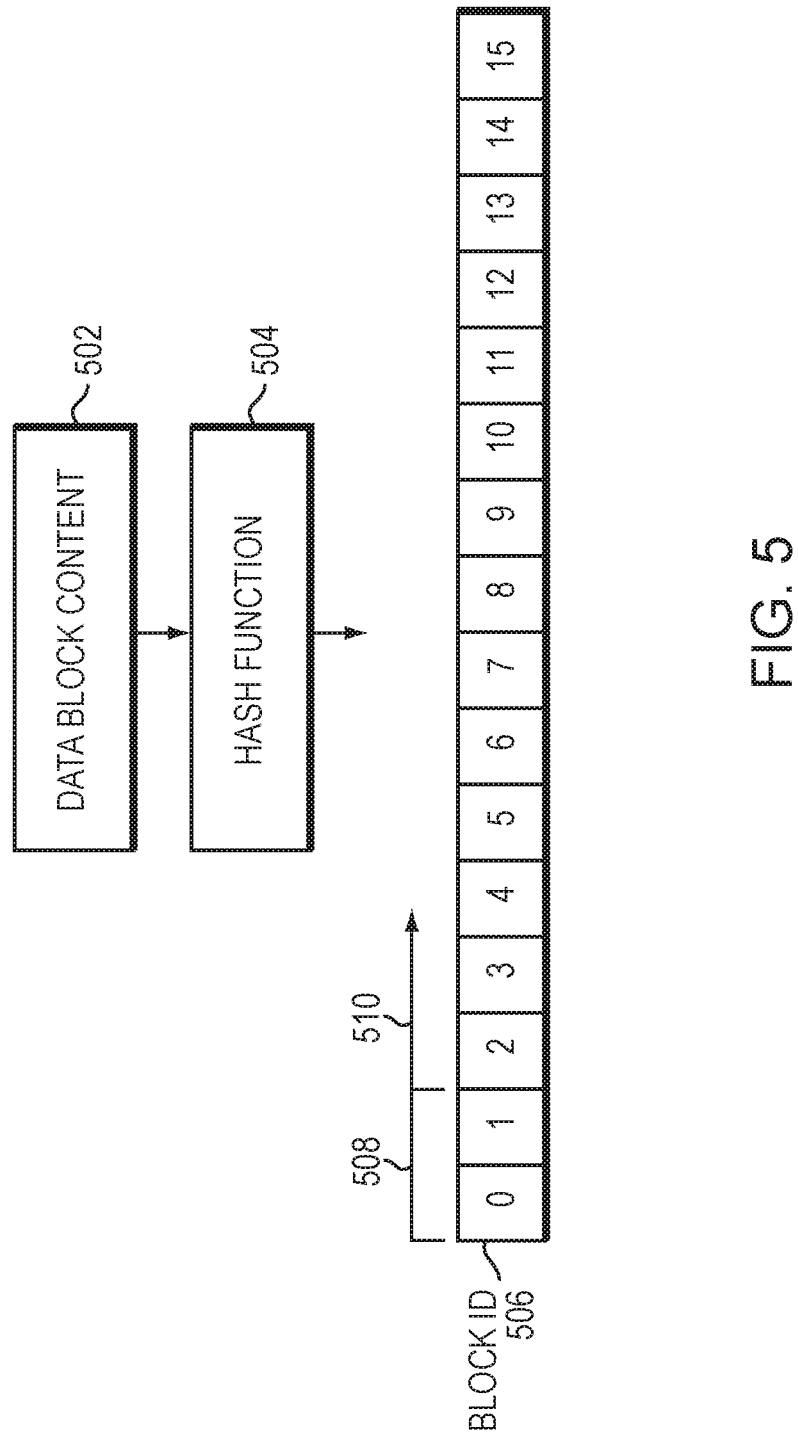
FIG. 5 is a block diagram illustrating details of a block identifier.

FIG. 5 is a block diagram illustrating details of a block identifier. In an embodiment, content 502 for a data block is received by storage service 300. As described above, the received data is divided into data blocks having content 502 that may be processed using hash function 504 to determine block identifiers (IDs) 506. That is, the data is divided into 4 KB data blocks, and each data block is hashed to generate a 16B hash value recorded as a block ID 506 of the data block; illustratively, the block ID 506 is used to locate the data on one or more storage devices 270 of the storage array 150. The data is illustratively organized within bins that are maintained by a block service 340*a-n* for storage on the storage devices. A bin may be derived from the block ID for storage of a corresponding data block by extracting a predefined number of bits from the block ID 506.

In an embodiment, the bin may be divided into buckets or "sublists" by extending the predefined number of bits extracted from the block ID. For example, a bin field 508 of the block ID may contain the first two (e.g., most significant) bytes (2B) of the block ID 506 used to generate a bin number (identifier) between 0 and 65,535 (depending on the number of 16 bits used) that identifies a bin. The bin identifier may also be used to identify a particular block service 340*a-n* and associated SSD 270. A sublist field 510 may then contain the next byte (1B) of the block ID used to generate a sublist identifier between 0 and 255 (depending on the number of 8 bits used) that identifies a sublist within the bin. Dividing the bin into sublists facilitates, inter alia, network transfer (or syncing) of data among block services in the event of a failure or crash of a storage node. The number of bits used for the sublist identifier may be set to an initial value, and then adjusted later as desired. Each block service 340*a-n* maintains a mapping between the block ID and a location of the data block on its associated storage device/SSD, i.e., block service drive (BSD).

Illustratively, the block ID (hash value) may be used to distribute the data blocks among the bins in an evenly balanced (distributed) arrangement according to capacity of the SSDs, wherein the balanced arrangement is based on "coupling" between the SSDs, i.e., each node/SSD shares approximately the same number of bins with any other node/SSD that is not in a same failure domain, i.e., protection domain, of the cluster. As a result, the data blocks are distributed across the nodes of the cluster based on content (i.e., content driven distribution of data blocks). This is advantageous for rebuilding data in the event of a failure (i.e., rebuilds) so that all SSDs perform approximately the same amount of work (e.g., reading/writing data) to enable fast and efficient rebuild by distributing the work equally among all the SSDs of the storage nodes of the cluster. In an embodiment, each block service maintains a mapping of block ID to data block location on storage devices (e.g., internal SSDs 270 and external storage array 150) coupled to the node.

Illustratively, bin assignments may be stored in a distributed key-value store across the cluster. Referring again to FIG. 4, the distributed key-value storage may be embodied as, e.g., a "zookeeper" database 450 configured to provide a distributed, shared-nothing (i.e., no single point of contention and failure) database used to store bin assignments (e.g., a bin assignment table 470) and configuration information that is consistent across all nodes of the cluster. In an embodiment, one or more nodes 200*c* has a service/process associated with the zookeeper database 450 that is configured to maintain the bin assignments (i.e., mappings) in connection with a data structure, e.g., the bin assignment table 470. Illustratively the distributed zookeeper is resident on up to, e.g., five (5) selected nodes in the cluster, wherein all other nodes connect to one of the selected nodes to obtain the bin assignment information. Thus, these selected "zookeeper" nodes have replicated zookeeper database images distributed among different failure domains of nodes in the cluster so that there is no single point of failure of the zookeeper database. In other words, other nodes issue zookeeper requests to their nearest zookeeper database image (zookeeper node) to obtain current bin assignments, which may then be cached at the nodes to improve access times.

For each data block received and stored in NVRAM 230*a,b*, the slice services 360*a,b* compute a corresponding bin number and consult the bin assignment table 470 to identify the SSDs 270*a,b* to which the data block is written. At boxes 408*a,b*, the slice services 360*a,b* of the storage nodes 200*a,b* then issue store requests to asynchronously flush copies of the compressed data block to the block services 340*a,b* associated with the identified SSDs. An exemplary store request issued by each slice service 360*a,b* and received at each block service 340*a,b* may have the following form:

store (block ID, compressed data)

The block service 340*a,b* for each SSD 270*a,b* (or storage devices of external storage array 150) determines if it has previously stored a copy of the data block. If not, the block service 340*a,b* stores the compressed data block associated with the block ID on the SSD 270*a,b*. Note that the block storage pool of aggregated SSDs is organized by content of the block ID (rather than when data was written or from where it originated) thereby providing a "content addressable" distributed storage architecture of the cluster. Such a content-addressable architecture facilitates deduplication of data "automatically" at the SSD level (i.e., for "free"), except for at least two copies of each data block stored on at least two SSDs of the cluster. In other words, the distributed storage architecture utilizes a single replication of data with inline deduplication of further copies of the data, i.e., there are at least two copies of data for redundancy purposes in the event of a hardware failure.

Updating No Sync Technique

The embodiments described herein are directed to an Updating No Sync (UNS) technique that is configured to ensure continuous data protection, such as replication and erasure coding, and storage service for content driven distribution of data served by storage nodes of a fault tolerant cluster in the event of a degraded cluster state, e.g., failure of one or more block services of nodes configured to process the data. According to the technique, a bin assignment service may coopt (i.e., delegate) one or more healthy BSs to temporarily store updates of data received at the SS while the cluster is in the degraded state as an overflow data path (hence the term "Updating No Sync," which denotes updating without synchronizing, i.e., not distributing the data within the cluster, but only accumulating an overflow of SS information). Once the cluster is no longer degraded, the accumulated overflow SS information at the BSs may be synchronized back to restored BSs, i.e., synchronized according to write path determination in the absence of node failure/unavailability.

As noted, a write request issued by a client 120 to the cluster 100 is received at a SS (i.e., a primary SS 360a) of a storage node (i.e., a primary node 200a) and traverses (i.e., passes through) a write path 400 of the primary SS 360a, wherein the data of the request is hashed 402, compressed 404, and stored (logged) on NVRAM 406a (i.e., cache 230a) of the primary node 200a. The data is then copied (replicated) to another SS (i.e., secondary SS 360b) on another storage node (i.e., secondary node 200b), which is determined by examining a slice service assignment data structure (i.e., SS assignment table 480) of the zookeeper database 450. The secondary SS 360b on the secondary node 200b accesses the zookeeper assignments to determine that the data is a replicated write and thus logs the replicated data in its cache 230b on the secondary node 200b. After acknowledging persistent storage (logging) of the data to the client, the primary and secondary SSs attempt to flush the data to one or more BSs 340a,b originally assigned to host a bin with a copy of the data. The BS assignments are illustratively maintained in the bin assignment table 470 that associates bin states to the BSs, e.g., according to the notation "Block Service: State." The states of the block services hosting the bins are maintained in the bin assignment table as the block services transition from one state to another.

In an embodiment, a BS 340 may host a bin having (assuming) one of a plurality of states as follows:

Active (A)
Pending Removal Dead (PRD)
Updating (U)
Pending Active (PA)
Pending Removal Active (PRA)

Illustratively, the Active (A) state denotes that (i) all data is present in the bin, that (ii) the BS is healthy, i.e., the BS can service (read) the data, and that (iii) a SS should flush (additional) data earmarked for the bin to the corresponding BS marked "A" for that bin. The Pending Removal Dead (PRD) state denotes that (i) the data present in the bin is incomplete (may lack information before or after the failure) and, thus, is possibly deficient, and that (ii) a SS is not required to flush data for the bin to the BS marked "PRD" for that bin. That is, the SSs of the cluster suspend flushing data to any BS hosting a bin designated (e.g., marked) as having (i.e., being in) the PRD state. As such, the PRD state represents a state for which a bin requires data recovery.

The Updating (U) state denotes that (i) the BS is healthy, that (ii) the data received by the block service is incomplete (data may be received before the failure via syncing and after the failure by flushed writes) and that (iii) a SS should flush data for the bin to the BS marked "U" because it is available (i.e., operating nominally) to receive new data for that bin. The Update state thus represents a state for which a BS is rebuilding the data of the failed bin it has taken over. The Pending Active (PA) state denotes that the BS is healthy, it has all the data, and that a SS must flush the data to that bin hosted by that BS, whereas the Pending Removal Active (PRA) state denotes a healthy BS having all of the required data such that a SS must flush to it, with the understanding that the BS is in the process of being removed. Examples of BSs transitioning from one bin state to another that may be advantageously employed with the embodiments described herein are disclosed in co-pending and commonly-assigned U.S. patent application Ser. No. 16/788,979, filed Feb. 12, 2020, titled BIN SYNCHING TECHNIQUE FOR MULTIPLE DATA PROTECTION SCHEMES, which application is hereby incorporated by reference as though fully set forth herein.

In the event the one or more BSs 340a,b of storage nodes 200a,b originally assigned to host the bin fails (resulting in a degraded cluster state), the primary and secondary SSs 360a,b may exhaust the storage capacity of their caches 230a,b. In an embodiment, the primary and secondary SSs 360a,b maintain the caches 230a,b on one or more storage devices (i.e., slice drives 270x) dedicated to the SSs of the storage nodes. However, the cache may be small, e.g., only a relatively small portion (e.g., one quarter) of the slice drives 270x may be reserved for caches 230, which may be fully consumed relatively fast. Therefore, the UNS technique initiates an overflow condition to ensure continuous data protection in the cluster by initializing one or more alternate BSs of healthy storage nodes to temporarily host bins of the unavailable nodes (i.e., failed node services and/or failed nodes) in the cluster. That is, the UNS technique delegates a BS of a healthy storage node to temporarily host bins of the unavailable nodes, so as to provide a large overflow capacity (i.e., improve on the limited capacity of the cache) during the unavailability of the (downed/failed) nodes. In this manner, recovery of data for restored (i.e., restart of failed) nodes may benefit from rapid data resynchronization over the nodes of the cluster as a mesh rebuild.

Figure 6:
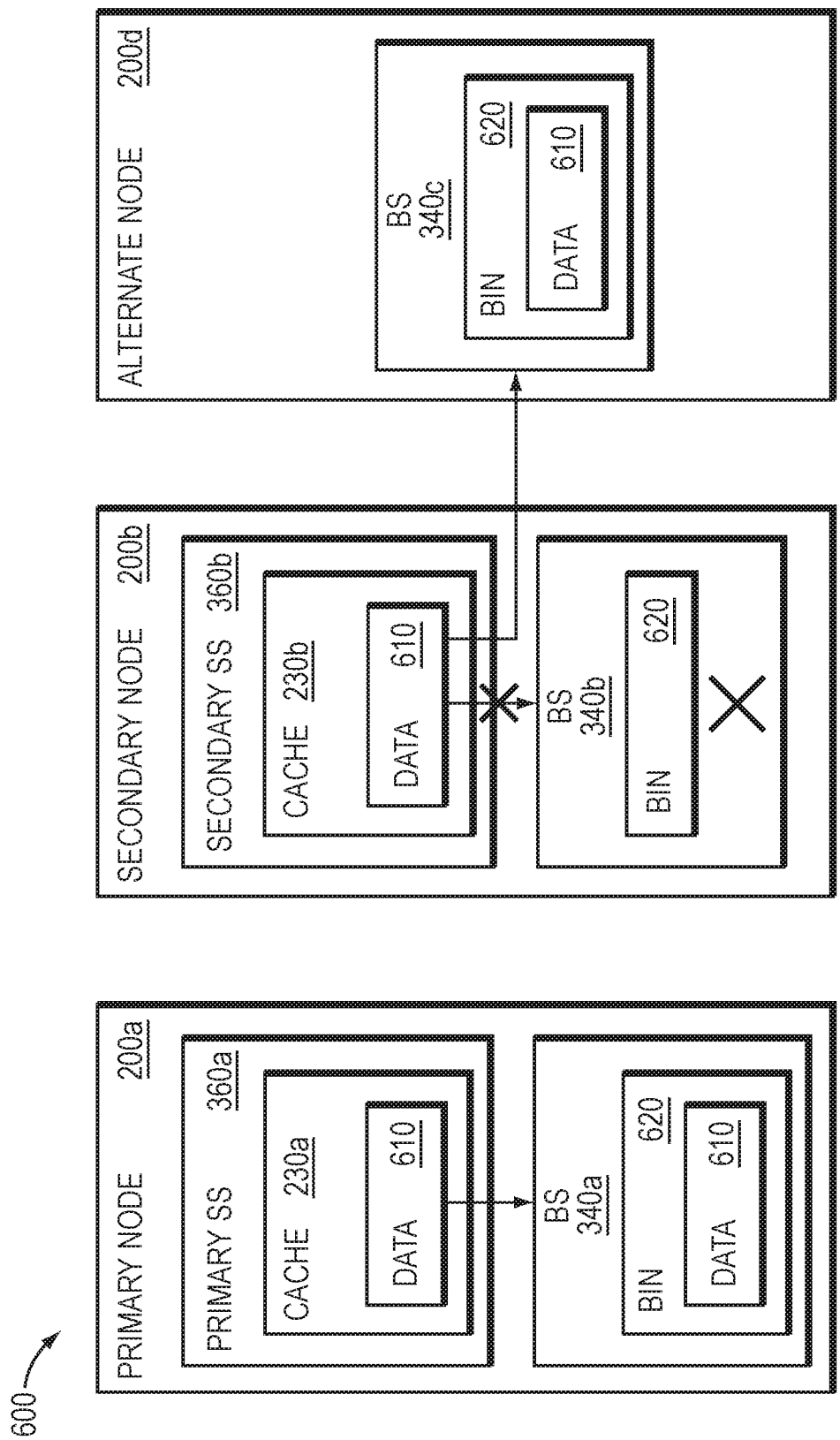
FIG. 6 illustrates an example workflow for ensuring continuous storage service of data in the event of a degraded state of the cluster.

FIG. 6 illustrates an example workflow 600 for ensuring continuous storage service of data in the event of a degraded state of the cluster in accordance with the UNS technique. In response to failure of node 200b or failure of a BS executing on the node, e.g., BS 340b, (denoted by X in FIG. 6) originally assigned to host a bin 620 with a copy of the data 610, the bin assignment service 280 initializes an alternate BS 340c of a healthy node 200d to temporarily host the bin 620 for the data 610. Since this temporary bin assignment may not be the final destination (i.e., location) for appropriately distributed cluster data (i.e., the overflow SS information), no further synchronization is attempted while the node remain unavailable. Once the cluster 100 is restored to health, synchronization to the appropriate bin(s) 620 on the originally intended BS(s) 340*b* of node 200*b* may resume. In that case, the overflow information is retrieved from the alternate BSs, i.e., BS 340*c*, and redistributed (if needed) to the original target BSs, i.e., BS 340*b* of the restored node 200*b* according to the bin assignment service 280 distribution of bins within the cluster (i.e., the data is synchronized to a target BS 340*b* that would have been used via the write path 400).

According to the UNS technique, another bin state, i.e., UNS, is provided that enables the SS(s) to flush their data to the alternate BS(s) assigned the UNS state for hosting the bin 620. Notably, bins of the alternate BS 340*c* are assigned a "UNS" bin state indicating temporary storage of the data copy based on criteria such as, e.g., available storage capacity on one or more storage devices, i.e., SSDs 270*a-n* ("block drives"), and/or load balancing of the nodes. As such, the SS(s) are required to flush data to the bins having the UNS bin state for later recovery, i.e., re-syncing (restoring) of data to one or more originally assigned BSs once recovered. To subsequently sync one or more bins having UNS states from the alternate BSs to the one or more originally-assigned BSs of subsequently recovered storage nodes or to one or more replacement BSs of healthy nodes, the UNS technique essentially spools the data from the block drives of the alternate BSs over to the block drives of the originally-assigned or replacement BSs.

Advantageously, the UNS technique may be used to perform rolling update for nodes of the cluster, e.g., software update during which services of the node are unavailable, while maintaining performance levels (e.g., large bursts of data) from client write requests. The UNS technique also allows continuous storage service operation of the cluster, e.g., for an extended period of time, in the event of failure (including power outages) to a group of storage nodes, thereby providing fault tolerance of the cluster. In addition, the technique obviates the need for large caches to allow for such continuous storage service operation of the fault tolerant cluster.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   storing a plurality of copies of data distributed among storage nodes of a cluster on caches of the storage nodes, the copies of data received by first services of the storage nodes configured to log the data on the caches;
   maintaining assignments of second services of the storage nodes hosting a bin with the copies of the data, the second services configured to store the data on storage devices of the storage nodes;
   attempting to flush the data from a first service to a second service of a storage node originally assigned to host the bin with a copy of the data;
   in response to failure of the second service of the storage node originally assigned to host the bin, initializing an alternate second service of a healthy storage node of the cluster to temporarily host the bin of the failed second service and to accumulate an overflow of the data received at the first service; and
   in response to restoration of the failed second service assigned to host the bin, synchronizing the accumulated overflow data to the restored second service.

2. The method of claim 1, wherein initializing the alternate second service further comprises:
   associating the temporarily hosted bin of the alternate second service with a state indicating accumulation of the overflow of data as updates without synchronization.

3. The method of claim 2, wherein the association of the temporarily hosted bin of the alternate second service with the state indicating accumulation of the overflow of data as updates without synchronization is recorded in a database accessible to the nodes of the cluster.

4. The method of claim 1, wherein the healthy storage node of the cluster having the alternate second service is selected based on a storage capacity of the healthy node.

5. The method of claim 1, wherein the healthy storage node of the cluster having the alternate second service is selected based on load balancing the nodes of the cluster.

6. The method of claim 1, further comprising:
   copying the data received by the first services of the storage nodes to the caches of the storage nodes.

7. The method of claim 6, wherein a capacity of one or more of the caches is exhausted.

8. The method of claim 1, further comprising:
   performing a software update on the storage node having the second service originally assigned to host the bin with the copy of the data.

9. The method of claim 7, wherein a rolling software update is performed node-by-node on the storage nodes of the cluster.

10. A system comprising:
    a network; and
    a cluster of nodes connected to the network, each node having a processor coupled to one or more storage devices, wherein the processor is configured to,
    store a plurality of copies of data distributed among the nodes on caches of the nodes, the copies of data received by first services of the nodes configured to log the data on the caches;
    maintain assignments of second services of the nodes hosting a bin with the copies of the data, the second services configured to store the data on the storage devices;
    attempt to flush the data from a first service to a second service of a storage node originally assigned to host the bin with a copy of the data;
    in response to failure of the second service of the node originally assigned to host the bin, initialize an alternate second service of a healthy node of the cluster to temporarily host the bin of the failed second service and to accumulate an overflow of the data received at the first service; and
    in response to restoration of the failed second service assigned to host the bin, synchronize the accumulated overflow data to the restored second service.

11. The system of claim 10, wherein the processor configured to initialize the alternate second service is further configured to:
associate the temporarily hosted bin of the alternate second service with a state indicating accumulation of the overflow of data as updates without synchronization.

12. The system of claim 11, wherein the association of the temporarily hosted bin of the alternate second service with a state indicating accumulation of the overflow of data as updates without synchronization is recorded in a database accessible to the nodes of the cluster.

13. The system of claim 11, wherein the healthy node of the cluster having the alternate second service is selected based on a storage capacity of the healthy node.

14. The system of claim 11, wherein the healthy node of the cluster having the alternate second service is selected based load balancing the nodes of the cluster.

15. The system of claim 11, wherein the processor is further configured to: copy the data received by the first services of the nodes to caches of the nodes.

16. The system of claim 15, wherein a capacity of the one or more caches is exhausted.

17. The system of claim 11, wherein the processor is further configured to: perform a software update on the node having the second service originally assigned to host the bin with the copy of the data.

18. The system of claim 17, wherein a rolling software update is performed node-by-node on the nodes of the cluster.

19. A non-transitory computer-readable medium including program instructions on one or more processors, the program instructions configured to:

store a plurality of copies of data distributed among storage nodes of a cluster on caches of the storage nodes, the copies of data received by first services of the storage nodes configured to log the data on the caches;

maintain assignments of second services of the storage nodes hosting a bin with the copies of the data, the second services configured to store the data on the storage devices; attempt to flush the data from a first service to a second service of a storage node originally assigned to host the bin with a copy of the data;

in response to failure of the second service of the storage node originally assigned to host the bin, initialize an alternate second service of a healthy storage node of the cluster to temporarily host the bin of the failed second service and to accumulate an overflow of the data received at the first service; and in response to restoration of the failed second service assigned to host the bin, synchronize the accumulated overflow data to the restored second service.

20. The non-transitory computer-readable medium of claim 19, wherein a rolling software update is performed node-by-node on the nodes of the cluster.

* * * * *